(12) United States Patent
Dai

(10) Patent No.: US 12,182,043 B2
(45) Date of Patent: Dec. 31, 2024

(54) SIGNAL TRANSCEIVING DEVICE AND SIGNAL TRANSCEIVING METHOD THEREOF

(71) Applicant: HTC Corporation, Taoyuan (TW)

(72) Inventor: Chen-Si Dai, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/953,343

(22) Filed: Sep. 27, 2022

(65) Prior Publication Data
US 2024/0104033 A1    Mar. 28, 2024

(51) Int. Cl.
*G06F 13/26* (2006.01)

(52) U.S. Cl.
CPC ..................... *G06F 13/26* (2013.01)

(58) Field of Classification Search
CPC ....................................................... G06F 13/26
See application file for complete search history.

(56) References Cited

U.S. PATENT DOCUMENTS

| | | | | |
|---|---|---|---|---|
| 11,360,918 B1* | 6/2022 | Wroblewski | ............. | G06F 1/12 |
| 2001/0032285 A1* | 10/2001 | Pawlowski | ............. | G06F 13/24 |
| | | | | 710/260 |
| 2005/0053095 A1* | 3/2005 | Kato | ..................... | G06K 7/0008 |
| | | | | 348/E5.097 |
| 2008/0147947 A1* | 6/2008 | Lu | ............................ | G06F 13/24 |
| | | | | 710/266 |
| 2011/0179212 A1* | 7/2011 | Hartman | ............. | G06F 13/3625 |
| | | | | 710/309 |
| 2013/0198432 A1* | 8/2013 | Ning | ................... | G06F 13/4027 |
| | | | | 710/306 |
| 2017/0115704 A1* | 4/2017 | Ent | ........................ | H01R 12/72 |
| 2020/0264807 A1* | 8/2020 | Sato | ...................... | G06F 3/0604 |

FOREIGN PATENT DOCUMENTS

TW    200825758    6/2008

OTHER PUBLICATIONS

"Office Action of Taiwan Counterpart Application", issued on Apr. 13, 2023, p. 1-p. 6.

* cited by examiner

*Primary Examiner* — Henry Tsai
*Assistant Examiner* — Harry Z Wang
(74) *Attorney, Agent, or Firm* — JCIPRNET

(57) ABSTRACT

A signal transceiving device includes a first controller and a second controller. The first controller is configured to transmit transmission data. The second controller is coupled to the first controller by a plurality of interrupt signal wires and a data transmission bus. Wherein the second controller respectively transmits a plurality of interrupt signals to the first controller through the plurality of interrupt signal wires, and the first controller determines a size of the transmission data according to the interrupt signals.

13 Claims, 4 Drawing Sheets

SIGNAL TRANSCEIVING DEVICE AND SIGNAL TRANSCEIVING METHOD THEREOF

TECHNICAL FIELD

The disclosure relates to a signal transceiving device and signal transceiving method thereof, and particular to the signal transceiving device which can adjust a size of transmission data.

DESCRIPTION OF RELATED ART

With advancements in the technology, electronic products have become necessary tools is people's life. In an electronic device, data transmission is always necessary for two separate systems. In conventional art, a first controller which transmits transmission data always transmits the transmits transmission with certain size. In some case, a second controller which receives the transmission data may not need full size of the transmission data. If the second controller merely needs a part of the transmission data, a bandwidth for transmitting the transmission data with full size is waste. That is, loadings of the first controller and the second controller are increased non-effectively since the transmission data is transmitted with full size.

SUMMARY

The disclosure provides a signal transceiving device and signal transceiving method which can adjust a size of transmission data.

The signal transceiving device including a first controller and a second controller. The first controller is configured to transmit transmission data. The second controller is coupled to the first controller by a plurality of interrupt signal wires and a data transmission bus. Wherein the second controller respectively transmits a plurality of interrupt signals to the first controller through the plurality of interrupt signal wires, and the first controller determines a size of the transmission data according to the interrupt signals.

The signal transceiving method includes: providing a plurality of interrupt signal wires to be coupled between a first controller and a second controller; respectively transmitting a plurality of interrupt signals to the first controller through the plurality of interrupt signal wires by the second controller; and, determining a size of the transmission data according to the interrupt signals by the first controller.

Based on the above, in the signal transceiving device, the second controller may send interrupt signals through the plurality of interrupt signal wires to the first controller during a signal transmission sequence. For controlling the size of the transmission data, the second controller may transit at least one of the interrupt signals. The first controller may determine the size of the transmission data, and transmits the transmission data with an expected size to the second controller.

In order to make the above-mentioned features and advantages of the disclosure comprehensible, embodiments accompanied with drawings are described in detail below.

DESCRIPTION OF EMBODIMENTS

Figure 1:
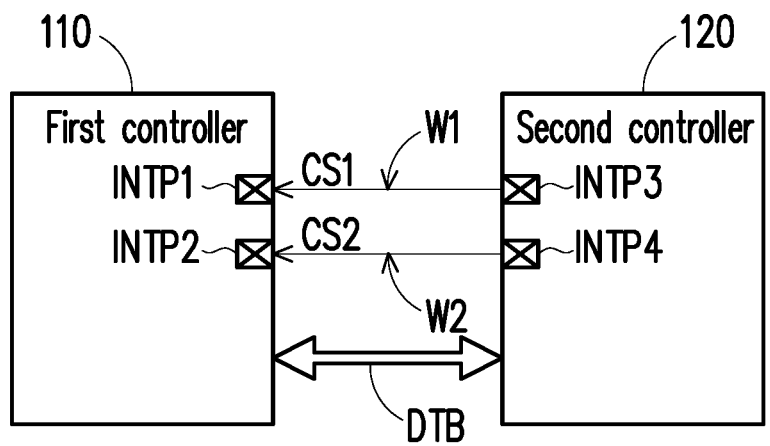
FIG. 1 illustrates a schematic diagram of a signal transceiving device of an embodiment of the disclosure.

Please refer to FIG. 1, which illustrates a schematic diagram of a signal transceiving device of an embodiment of the disclosure. The signal transceiving device 100 includes a first controller 110 and a second controller 120. The first controller 110 has a first interrupt pin INTP1 and a second interrupt pin INTP2. The first interrupt pin INTP1 of the first controller 110 may be coupled to one end of a first interrupt signal wire W1, and the second interrupt pin INTP2 of the first controller 110 may be coupled to one end of a second interrupt signal wire W2. The second controller 120 has a first interrupt pin INTP3 and a second interrupt pin INTP4. The first interrupt pin INTP3 of the second controller 120 may be coupled to another end of the first interrupt signal wire W1, and the second interrupt pin INTP4 of the second controller 120 may be coupled to another end of the second interrupt signal wire W2. That is, the first controller 110 may be coupled to the second controller 120 through the first interrupt signal wire W1 and the second interrupt signal wire W2.

The first interrupt signal wire W1 and the second interrupt signal wire W2 are respectively configured to transmit interrupt signals CS1 and CS2. In this embodiment, the second controller 120 may transmit the interrupt signal CS1 to the first controller 110 through the first interrupt signal wire W1, and the second controller 120 may transmit the interrupt signal CS2 to the first controller 110 through the second interrupt signal wire W2.

On the other hand, the first controller 110 is also coupled to the second controller 120 through a data transmission bus DTB. The data transmission bus DTB is used to transmit data between the first controller 110 and the second controller 120.

In this embodiment, during a data transmission operation, if the second controller 120 need to read data from the first controller 110. The second controller 120 may send the interrupt signals CS1 and CS2 to the first controller 110 respectively through the first interrupt wire W1 and the second interrupt wire W2. In this embodiment, the second controller 120 may generate the interrupt signals CS1 and CS2 according to a size of necessary transmission data. Correspondingly, the first controller 110 may receive the interrupt signals CS1 and CS2 respectively through the first interrupt wire W1 and the second interrupt wire W2. The first controller 110 may determine the size of the transmission data, and send out the transmission data with expected size to the second controller 120 through the data transmission bus DTB.

In detail, the second controller 120 may determine whether to generate transition edge on each of the interrupt signals CS1 to CS2 according to the size of the necessary transmission data. For example, if the size of the necessary transmission data is a first size, the second controller 120 may merely select the interrupt signal CS1 to be transited; if the size of the necessary transmission data is a second size, the second controller 120 may merely select the interrupt signal CS2 to be transited; if the size of the necessary transmission data is a third size, the second controller 120 may select the interrupt signals CS1 and CS2 to be transited.

Furthermore, the first controller 110 may detect transition edge of each of the interrupt signals CS1 and CS2 to determine the size of the transmission data. For example, if only one transition edge on the interrupt signal CS1 is detected, the first controller 110 may determine the size of the transmission data is a first size. If only one transition edge on the interrupt signal CS2 is detected by the first controller 110, the first controller 110 may determine the size of the transmission data is a second size. If transition edges on both of the interrupt signals CS1 and CS2 are detected by the first controller 110, the first controller 110 may determine the size of the transmission data is a third size. In here, the first size may be smaller than the second size, and the second size may be smaller than the third size. In some embodiment, the first size may be 16 bytes, the second size may be 32 bytes, and the third size may be 64 bytes.

If the size of the transmission data is detected to be the first size, the first controller 110 may transmit the transmission data with the first size to the second controller 120 through the data transmission bus DTB. If the size of the transmission data is detected to be the second size, the first controller 110 may transmit the transmission data with the second size to the second controller 120 through the data transmission bus DTB. Of course, if the size of the transmission data is detected to be the third size, the first controller 110 may transmit the transmission data with the third size to the second controller 120 through the data transmission bus DTB. Such as that, the first controller 110 only needs to transmit the transmission data with necessary size to the second controller 120, and loading of the first controller 110 may be reduced.

On the other hand, the data transmission bus DTB may be a serial interface data bus, such as serial peripheral interface (SPI) data bus or universal asynchronous receiver/transmitter (UART) data bus.

In this embodiment, the first controller 110 and the second controller 120 are processors having a computation function. Alternatively, each of the first controller 110 and the second controller 120 may be a hardware circuit designed by using hardware description language (HDL) or any digital circuit design method well known by related technicians of the field, and implemented through a field programmable gate array (FPGA), a complex programmable logic device (CPLD) or an application-specific integrated circuit (ASIC).

Figure 2A:
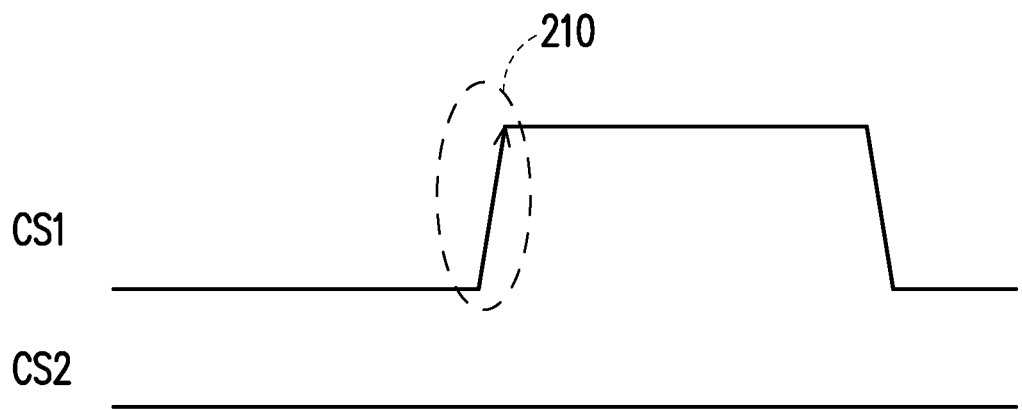
FIG. 2A to FIG. 2C are waveform plots of interrupt signals according to an embodiment of present disclosure.
Figure 2B:
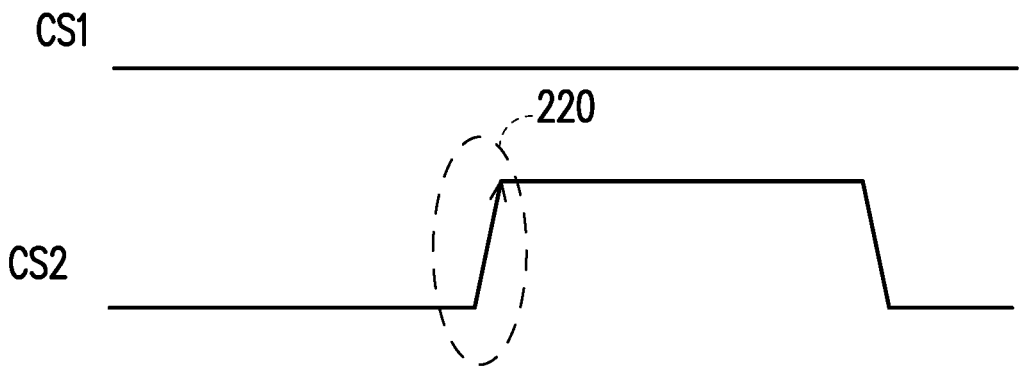
Figure 2C:
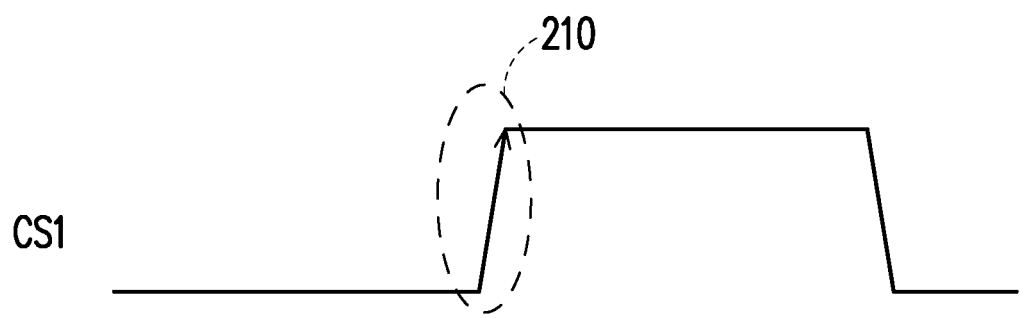
Figure 2C:
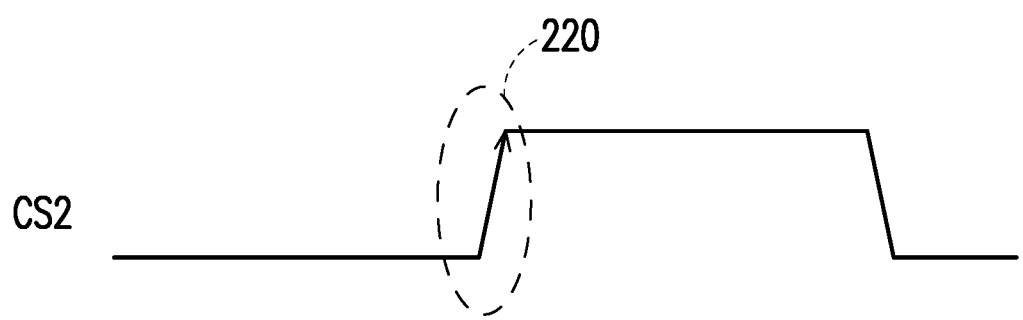

Please refer to FIG. 1 and FIG. 2A to FIG. 2C commonly, wherein FIG. 2A to FIG. 2C are waveform plots of interrupt signals according to an embodiment of present disclosure. In FIG. 2A to FIG. 2B, the interrupt signal CS1 and CS2 are generated by the second controller 120, and are detected by the first controller 110. In FIG. 2A, one transition edge 210 on the interrupt signal CS1 can be detected, and no transition edge on the interrupt signal CS2 can be detected by the first controller 110. That is, the first controller 110 may determine the size of the transmission data is the first size. In FIG. 2B, no transition edge on the interrupt signal CS1 can be detected, and one transition edge 220 on the interrupt signal CS2 can be detected by the first controller 110. That is, the first controller 110 may determine the size of the transmission data is the second size. In FIG. 2C, one transition edge 210 on the interrupt signal CS1 can be detected, and one transition edge 220 on the interrupt signal CS2 can be detected by the first controller 110. That is, the first controller 110 may determine the size of the transmission data is the third size.

In detail, the first controller 110 may detect the interrupt signals CS1 and CS2 by continuously monitoring logic levels of the interrupt signals CS1 and CS2. Take the interrupt signal CS1 as an example, if the first controller 110 detects the interrupt signal CS1 is low logic level at a time point t1 and detects the interrupt signal CS1 is changed to high logic level at a time point t2 which is next to the time point t1, the transition edge 210 which is rising edge can be detected.

It should be noted here, in this embodiment, the second controller 120 may generated the interrupt signals CS1 and CS2 with rising edges 210 and 220 to inform the first controller 110 necessary size of the transmission data. In other embodiments, the second controller 120 may generated the interrupt signals CS1 and CS2 with falling edges to inform the first controller 110 necessary size of the transmission data, too.

Figure 3:
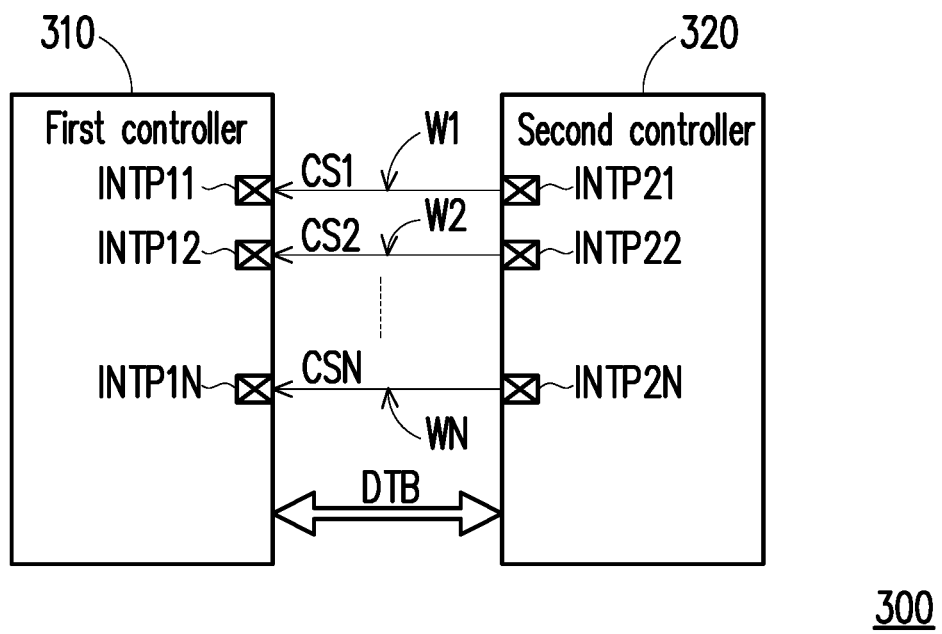
FIG. 3 illustrates a schematic diagram of a signal transceiving device according to another embodiment of present disclosure.

Please refer to FIG. 3, which illustrates a schematic diagram of a signal transceiving device according to another embodiment of present disclosure. The signal transceiving device 300 includes a first controller 310 and a second controller 320. The first controller 310 has a plurality of interrupt pins INTP11 to INTP1N. The interrupt pins INTP11 to the interrupt pins INTP1N of the first controller 310 may be respectively coupled to one end of interrupt signal wires W1 to WN. The second controller 320 has a plurality of interrupt pins INTP21 to INTP2N. The interrupt pins INTP21 to the interrupt pins INTP2N of the second controller 320 may be respectively coupled to another end of the interrupt signal wire W1 to WN. That is, the first controller 310 may be coupled to the second controller 320 through the interrupt signal wires W1 to WN. In this embodiment, number of the interrupt signal wire W1 to WN may be larger than 2.

The interrupt signal wires W1 to WN are respectively configured to transmit interrupt signals CS1 to CSN. In this embodiment, the second controller 320 may transmit the interrupt signals CS1 to CSN to the first controller 310 through the first interrupt signal wires W1 to WN, respectively.

On the other hand, the first controller 310 is also coupled to the second controller 120 through a data transmission bus DTB. The data transmission bus DTB is used to transmit data between the first controller 310 and the second controller 320.

In this embodiment, during a data transmission operation, if the second controller 320 need to read data from the first controller 310. The second controller 320 may send the interrupt signals CS1 to CSN to the first controller 110 respectively through the interrupt wires W1 to WN. The interrupt signals CS1 to CSN are used to inform the first controller 310 a size of necessary transmission data. The second controller 320 may generate the interrupt signals CS1 to CSN according to a size of necessary transmission data. The first controller 310 may determine the size of the transmission data according to the interrupt signals CS1 to CSN, and send out the transmission data with expected size to the second controller 120 through the data transmission bus DTB.

In detail, the second controller 320 may determine whether to generate transition edge on each of the interrupt signals CS1 to CSN according to the size of the necessary transmission data. For example, if the size of the necessary transmission data is a first size, the second controller 320 may merely select the interrupt signal CS1 to be transited; if the size of the necessary transmission data is a second size, the second controller 320 may merely select the interrupt signal CS2 to be transited; if the size of the necessary transmission data is a third size, the second controller 320 may select the interrupt signals CS1 and CS2 to be transited;

and if the size of the necessary transmission data is a fourth size, the second controller 320 may merely select the interrupt signal CSN to be transited. Wherein the first size, the second size, the third size and the fourth size are different.

It should be noted here, a relationship between the size of the necessary transmission data and transition states of the interrupt signals CS1 to CSN can be arbitrarily determined by a person skilled in this art, and the examples mentioned above are only exemplary examples only and not used to limit a scope of this disclosure.

Furthermore, the first controller 310 may detect transition edge of each of the interrupt signals CS1 to CSN to determine the size of the transmission data. For example, if only one transition edge on the interrupt signal CS1 is detected, the first controller 310 may determine the size of the transmission data is a first size. If only one transition edge on the interrupt signal CS2 is detected by the first controller 310, the first controller 310 may determine the size of the transmission data is a second size. If transition edges on both of the interrupt signals CS1 and CS2 are detected by the first controller 310, the first controller 310 may determine the size of the transmission data is a third size. If only one transition edge on the interrupt signal CSN is detected by the first controller 310, the first controller 310 may determine the size of the transmission data is a fourth size.

Figure 4:
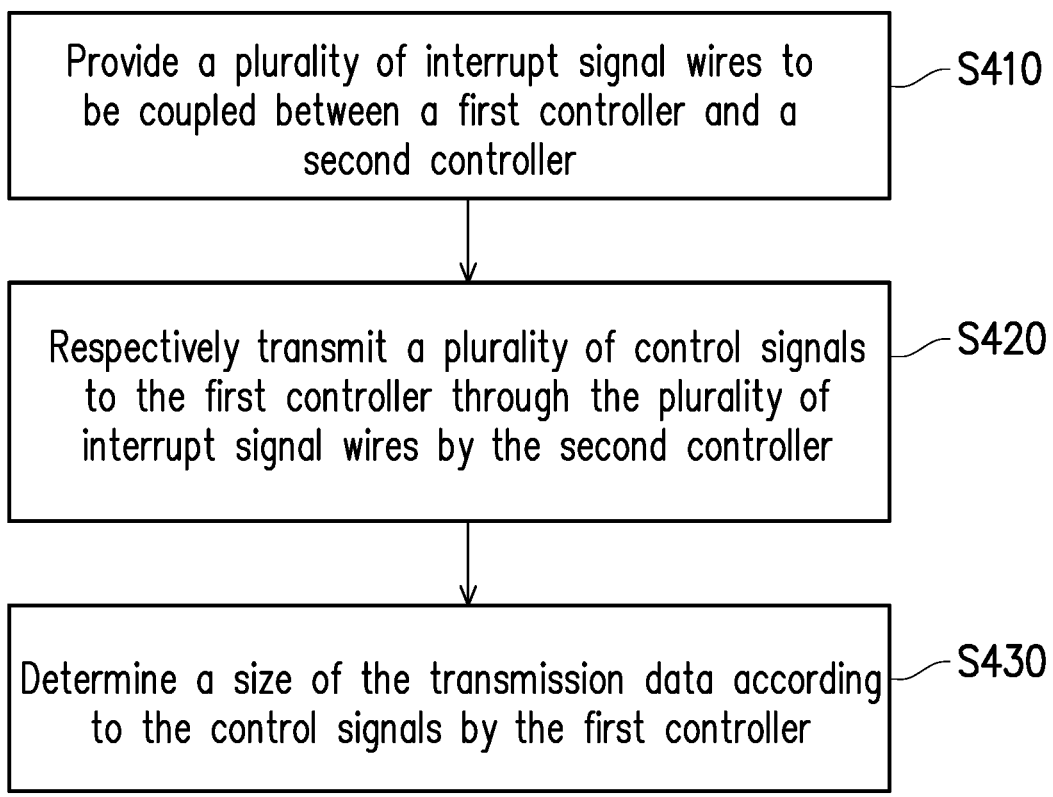
FIG. 4 illustrates a flow chart of a data transceiving method according to an embodiment of present disclosure.

Please refer to FIG. 4, which illustrates a flow chart of a data transceiving method according to an embodiment of present disclosure. In step S410, a plurality of interrupt signal wires are provided to be coupled between a first controller and a second controller. In step S420, a plurality of interrupt signals are respectively transmitted to the first controller through the plurality of interrupt signal wires by the second controller. In step S430, a size of the transmission data can be determined according to the interrupt signals by the first controller.

Details of the steps S410 to S430 have been described in the embodiments mentioned above, and no more repeatedly description here.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A signal transceiving device, comprising:
a first controller, being configured to transmit transmission data;
a second controller, coupled to the first controller by a plurality of interrupt signal wires and a data transmission bus,
wherein the second controller is configured to respectively transmit a plurality of interrupt signals to the first controller through the plurality of interrupt signal wires, and the first controller is configured to determine a size of the transmission data according to the interrupt signals, wherein the first controller is further configured to:
determine the size of the transmission data is a first size if only a transition edge of a first interrupt signal of the interrupt signals is detected;
determine the size of the transmission data is a second size if only a transition edge of a second interrupt signal of the interrupt signals is detected; and
determine the size of the transmission data is a third size if both of the transition edges of the first interrupt signal and the second interrupt signal of the interrupt signals are detected.

2. The signal transceiving device according to claim 1, wherein the first controller is configured to detect a transition edge of each of the interrupt signals to determine the size of the transmission data.

3. The signal transceiving device according to claim 2, wherein the transition edge is a rising edge or a falling edge.

4. The signal transceiving device according to claim 1, wherein the first size is smaller than the second size and the second size is smaller than the third size.

5. The signal transceiving device according to claim 1, wherein the first controller is further configured to:
determine the size of the transmission data is a fourth size if only the transition edge of a third interrupt signal of the interrupt signals is detected,
wherein the fourth size is different from any one of the first size, the second size and the third size.

6. The signal transceiving device according to claim 1, wherein the data transmission bus is a serial interface data bus.

7. The signal transceiving device according to claim 6, wherein the data transmission bus is serial peripheral interface (SPI) data bus or universal asynchronous receiver/transmitter (UART) data bus.

8. The signal transceiving device according to claim 1, wherein the first controller has a plurality of first interrupt pins to respectively couple to the plurality of interrupt signal wires, the second controller has a plurality of second interrupt pins to respectively couple to the plurality of interrupt signal wires.

9. A signal transceiving method, comprising:
providing a plurality of interrupt signal wires to be coupled between a first controller and a second controller;
respectively transmitting a plurality of interrupt signals to the first controller through the plurality of interrupt signal wires by the second controller; and
determining a size of the transmission data according to the interrupt signals by the first controller, wherein the step of determining the size of the transmission data according to the interrupt signals by the first controller further comprising:
detecting, by the first controller, transition edges of a first instance of a first interrupt signal, a second interrupt signal, and up to an nth interrupt signal of the plurality of interrupt signals;
determining, by the first controller, the size of the transmission data as a first size after the transition edge of the first interrupted signal is detected from the first instance;
detecting, by the first controller, transition edges of a second instance of the first interrupt signal, the second interrupt signal, and up to the nth interrupt signal of the plurality of interrupt signals;
determining, by the first controller, the size of the transmission data as a second size after the transition edge of the second interrupted signal is detected from the second instance;
detecting, by the first controller, transition edges of a third instance of a first interrupt signal, a second interrupt signal, and up to an nth interrupt signal of the plurality of interrupt signals; and
determining, by the first controller, the size of the transmission data as a third size after both the transition edge of the first interrupted signal and the second interrupted signal are detected from the third instance.

10. The signal transceiving method according to claim 9, wherein a step of determining the size of the transmission data according to the interrupt signals by the first controller comprises:
   detecting a transition edge of each of the interrupt signals to determine the size of the transmission data.

11. The signal transceiving method according to claim 10, wherein the transition edge is a rising edge or a falling edge.

12. The signal transceiving method according to claim 9, wherein the first size is smaller than the second size and the second size is smaller than the third size.

13. The signal transceiving method according to claim 9, further comprising:
   determining the size of the transmission data is a fourth size if only the transition edge of a third interrupt signal of the interrupt signals is detected,
   wherein the fourth size is different from any one of the first size, the second size and the third size.

* * * * *